US012782155B2

(12) United States Patent
Ogasawara et al.

(10) Patent No.: US 12,782,155 B2
(45) Date of Patent: Nov. 3, 2026

(54) VEHICLE DISPLAY DEVICE

(71) Applicant: YAZAKI CORPORATION, Tokyo (JP)

(72) Inventors: Kazuyoshi Ogasawara, Susono (JP); Takenobu Tomihira, Susono (JP); Hiroki Kitahara, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 155 days.

(21) Appl. No.: 18/454,000

(22) Filed: Aug. 22, 2023

(65) Prior Publication Data

US 2024/0068833 A1 Feb. 29, 2024

(30) Foreign Application Priority Data

Aug. 29, 2022 (JP) ................................. 2022-136080

(51) Int. Cl.
*G01C 21/36* (2006.01)
*G08G 1/01* (2006.01)

(52) U.S. Cl.
CPC ......... *G01C 21/365* (2013.01); *G08G 1/0112* (2013.01)

(58) Field of Classification Search
CPC ...... G01C 21/365; G08G 1/0112; B60R 1/24; B60R 2300/205; B60R 2300/80
See application file for complete search history.

(56) References Cited

U.S. PATENT DOCUMENTS 10,095,039 B2 * 10/2018 Onda ........................ B60R 1/24
2011/0301813 A1 * 12/2011 Sun ...................... B62D 15/029 348/148
2018/0181820 A1 * 6/2018 Ide ......................... G08G 1/167
2018/0240258 A1 8/2018 Kosaka et al.
2019/0196184 A1 * 6/2019 Takizawa ............... B60K 35/81

FOREIGN PATENT DOCUMENTS

JP 5826375 B2 * 12/2015 ............. B60K 35/23
JP 6536855 B2 7/2019
JP 2019196082 A * 11/2019 ............ B60W 30/16

OTHER PUBLICATIONS

English translation of Shimizu (JP-2019196082-A) (Year: 2025).*
English Translation of JP5826375B2 (Year: 2026).*

* cited by examiner

*Primary Examiner* — Scott A Browne
*Assistant Examiner* — Shahira Baajour
(74) *Attorney, Agent, or Firm* — KENEALY VAIDYA LLP

(57) ABSTRACT

A vehicle display device includes a display that is mounted on a vehicle and superimposes and displays an image on a real landscape in front with respect to a front windshield, a controller that controls the display, and a position information acquisition unit that acquires a position of a preceding vehicle. The controller calculates a first virtual straight line that connects the position of the preceding vehicle and a position of the vehicle. When the controller determines that the first virtual straight line is along a straight direction of the vehicle, the controller displays a marker image at a position below the preceding vehicle. When the controller determines that the first virtual straight line is inclined with respect to the straight direction, the controller performs display movement control to display the marker image so as to be shifted from the position below the preceding vehicle.

6 Claims, 10 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2022-136080 filed in Japan on Aug. 29, 2022.

BACKGROUND OF THE INVENTION

1. Field of the Invention

The present invention relates to a vehicle display device.

2. Description of the Related Art

Conventionally, there is an augmented reality head-up display device (AR-HUD) that superimposes and displays a display image such as a marker image to follow an object such as a preceding vehicle. Japanese Patent No. 6536855 discloses a vehicle display device that continues to display a marker image in a peripheral portion of a vehicle widthwise side edge on an outer side and additionally displays a marker indicating a position of a preceding vehicle outside a display range in a case where the preceding vehicle is located on the outer side of any vehicle widthwise side edge of a display area.

In the vehicle display device, when a marker image displayed corresponding to a target object such as a preceding vehicle overlaps an object (such as a vehicle) different from the target object or a colored line (center line, road side, and lane boundary) on a road, there is a possibility that it is difficult to see the marker image and the marker image is erroneously recognized. Therefore, it is desired to improve the visibility of the marker image in the vehicle display device.

SUMMARY OF THE INVENTION

An object of the present invention is to provide a vehicle display device capable of improving visibility of a marker image.

In order to achieve the above mentioned object, a vehicle display device according to one aspect of the present invention includes a display mounted on a vehicle, the display superimposing and displaying an image on a real landscape in front of the vehicle with respect to a front windshield of the vehicle; a controller configured to control the display; and a position information acquisition unit that acquires a position of a preceding vehicle followed by the vehicle, wherein the controller calculates a first virtual straight line connecting the position of the preceding vehicle acquired by the position information acquisition unit and a position of the vehicle, when the controller determines that the first virtual straight line is along a straight direction of the vehicle, the controller displays a marker image at a position below the preceding vehicle as viewed from a viewpoint position of the vehicle, when the controller determines that the first virtual straight line is inclined with respect to the straight direction, the controller performs display movement control to display the marker image so as to be shifted in a direction opposite to an inclination direction of the first virtual straight line with respect to the straight direction from the position below the preceding vehicle, and in the display movement control, an amount by which the marker image is shifted from the position below the preceding vehicle is determined based on an inclination of the first virtual straight line with respect to the straight direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a vehicle display device according to an embodiment of the present invention will be described in detail with reference to the drawings. Note that the present invention is not limited by the embodiment. In addition, constituent elements in the following embodiments include those that can be easily assumed by those skilled in the art or those that are substantially the same.

Embodiment

Figure 1:
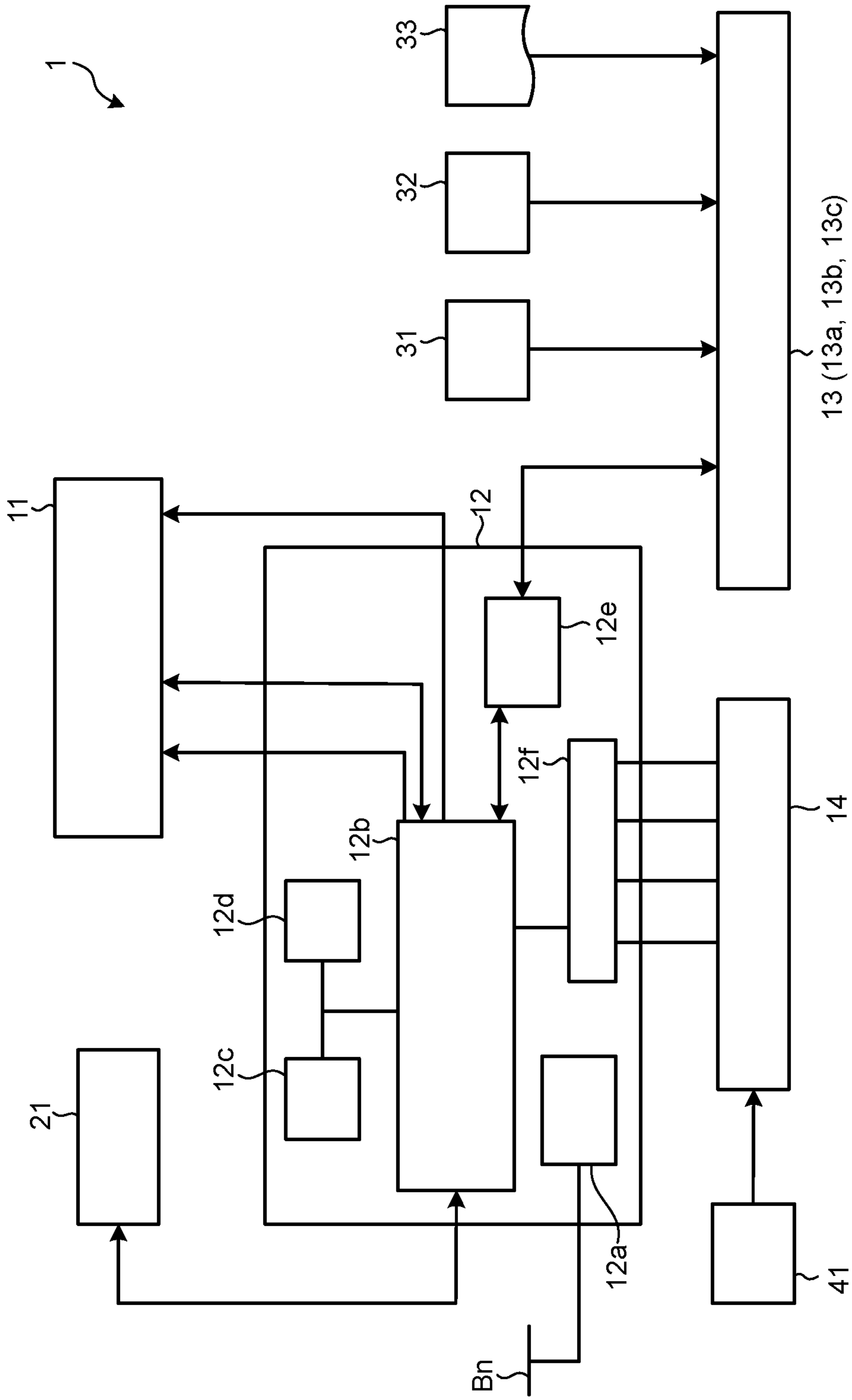
FIG. 1 is a diagram illustrating a vehicle display device according to an embodiment.
Figure 2:
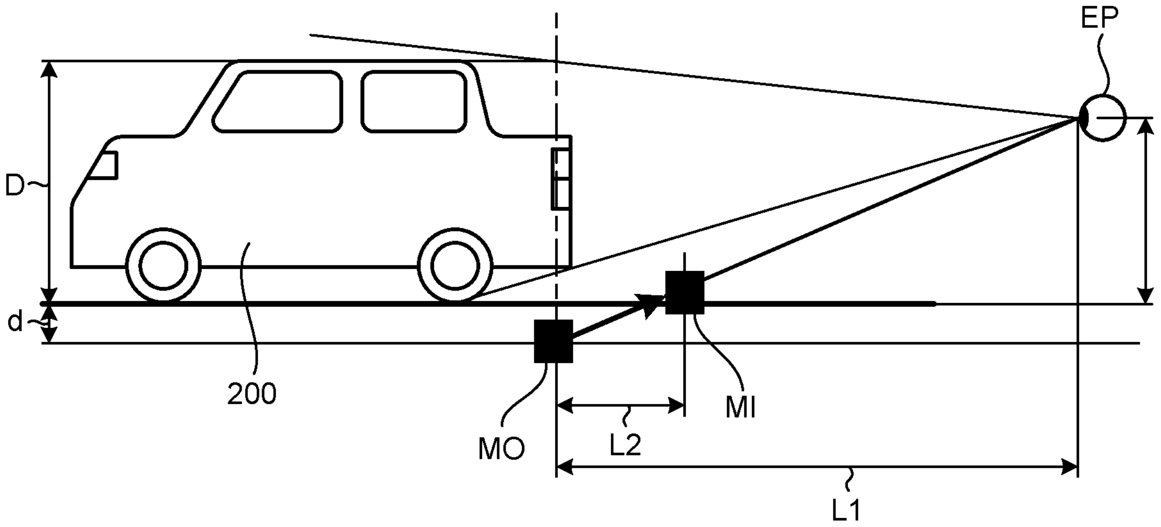
FIG. 2 is a schematic diagram illustrating a display example of a marker image by the vehicle display device according to the embodiment.
Figure 3:
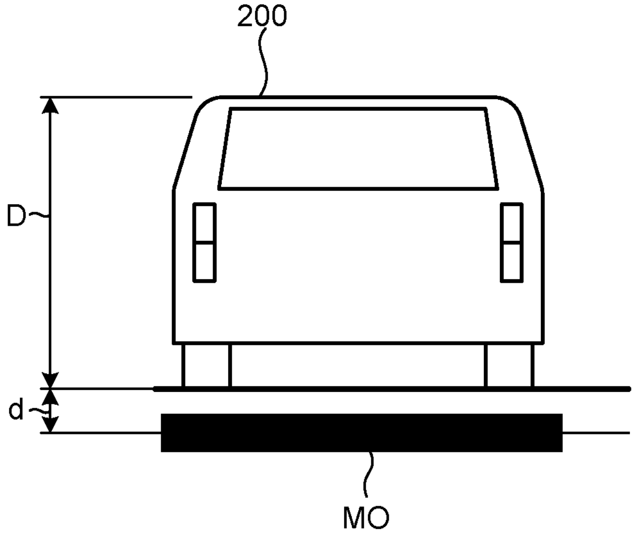
FIG. 3 is a schematic diagram illustrating a display example of a marker image by the vehicle display device according to the embodiment.
Figure 4:
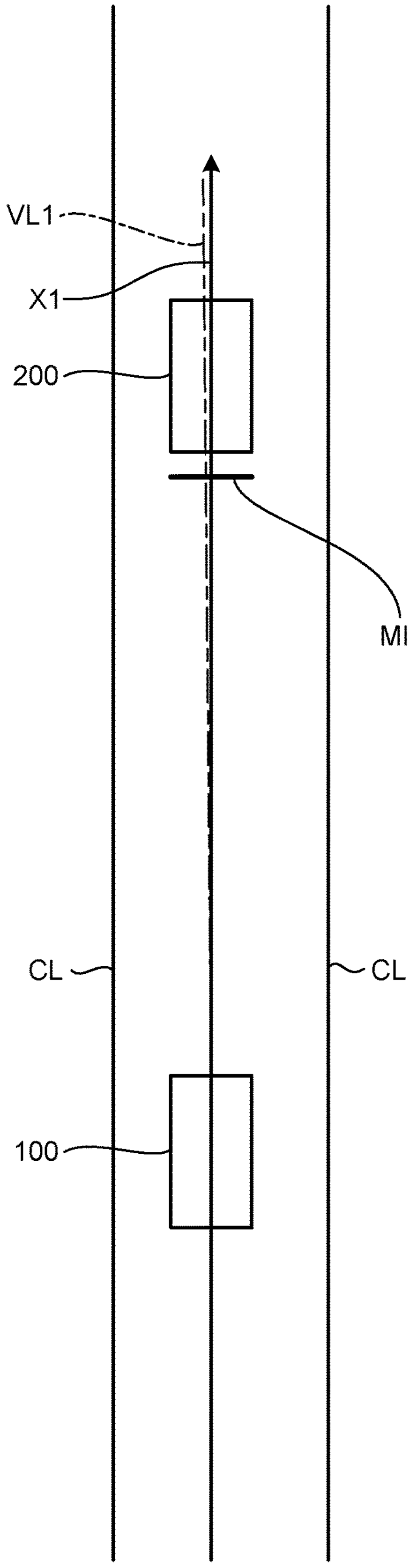
FIG. 4 is a schematic diagram illustrating a display example of a marker image by the vehicle display device according to the embodiment.
Figure 5:
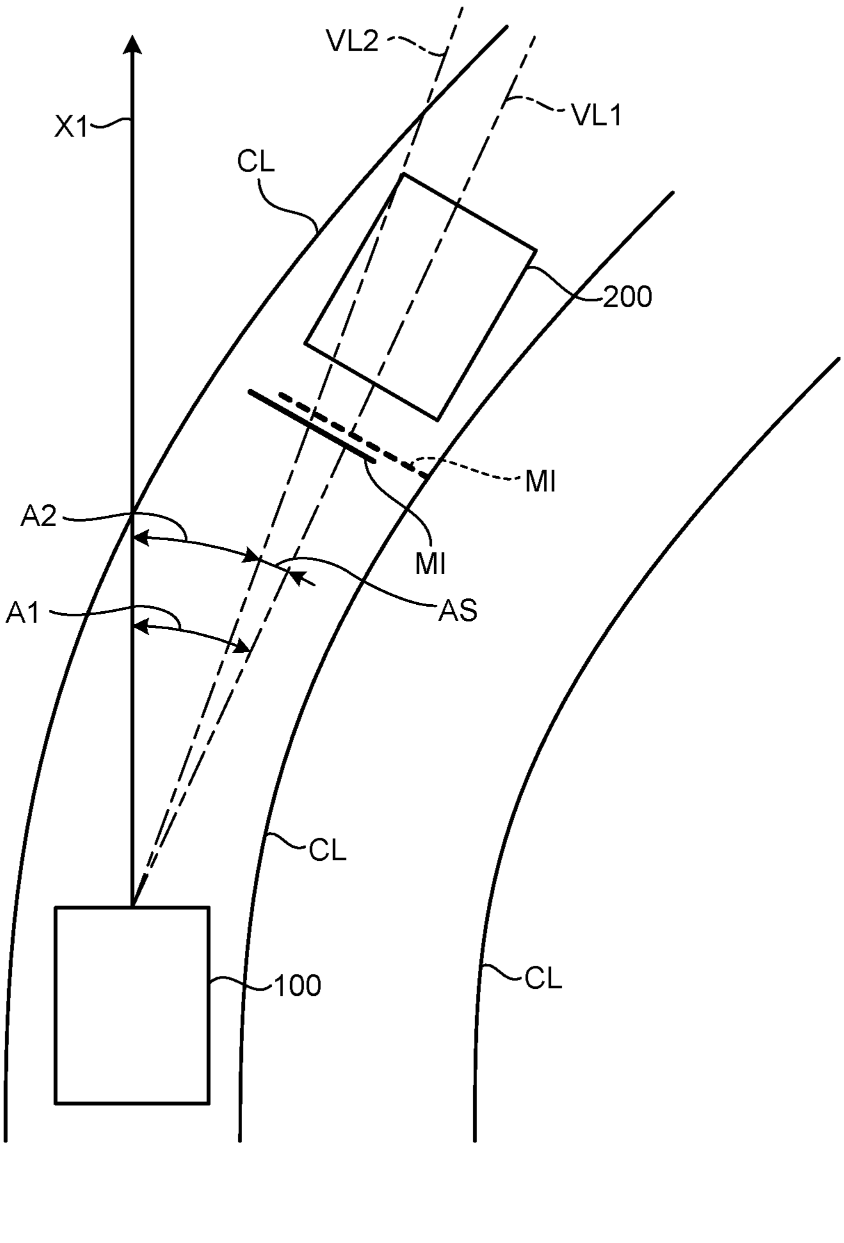
FIG. 5 is a schematic diagram illustrating a display example of a marker image by the vehicle display device according to the embodiment.
Figure 6:
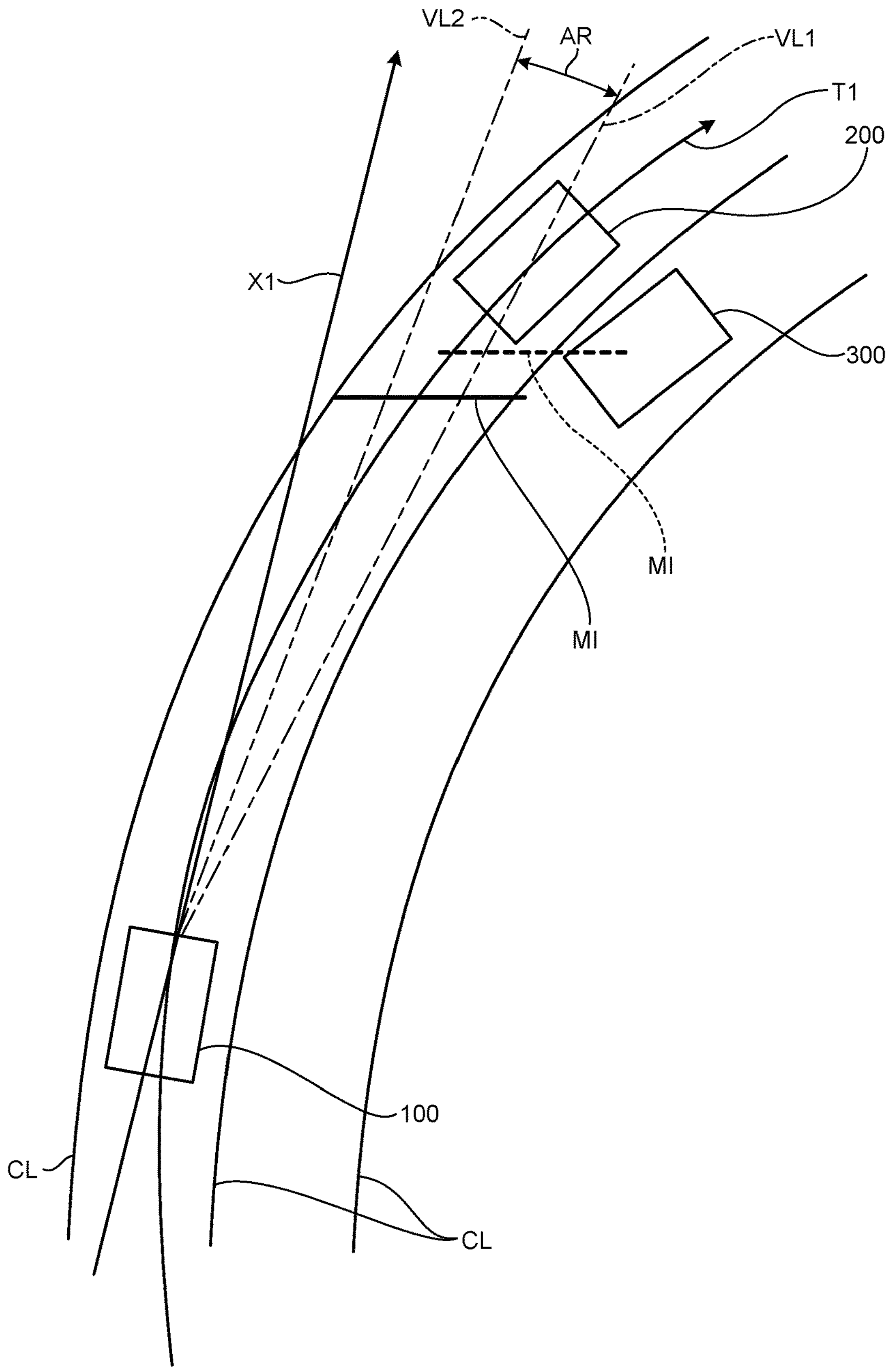
FIG. 6 is a schematic diagram illustrating a display example of a marker image by the vehicle display device according to the embodiment.
Figure 7:
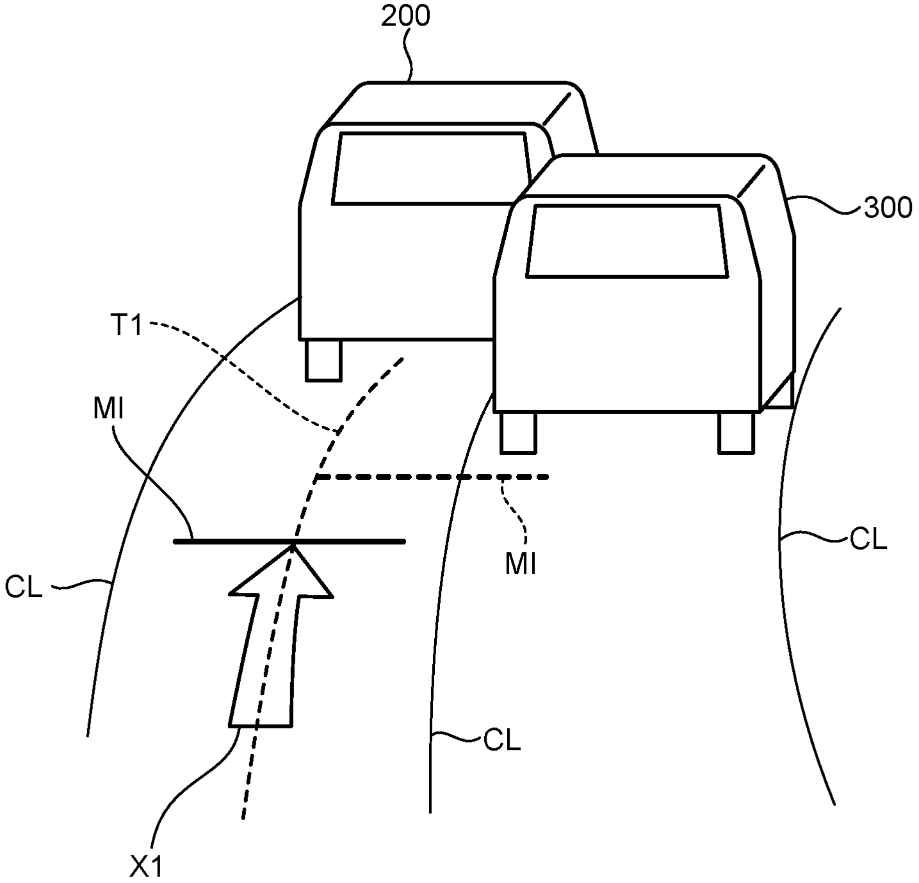
FIG. 7 is a schematic diagram illustrating a display example of a marker image by the vehicle display device according to the embodiment.
Figure 8:
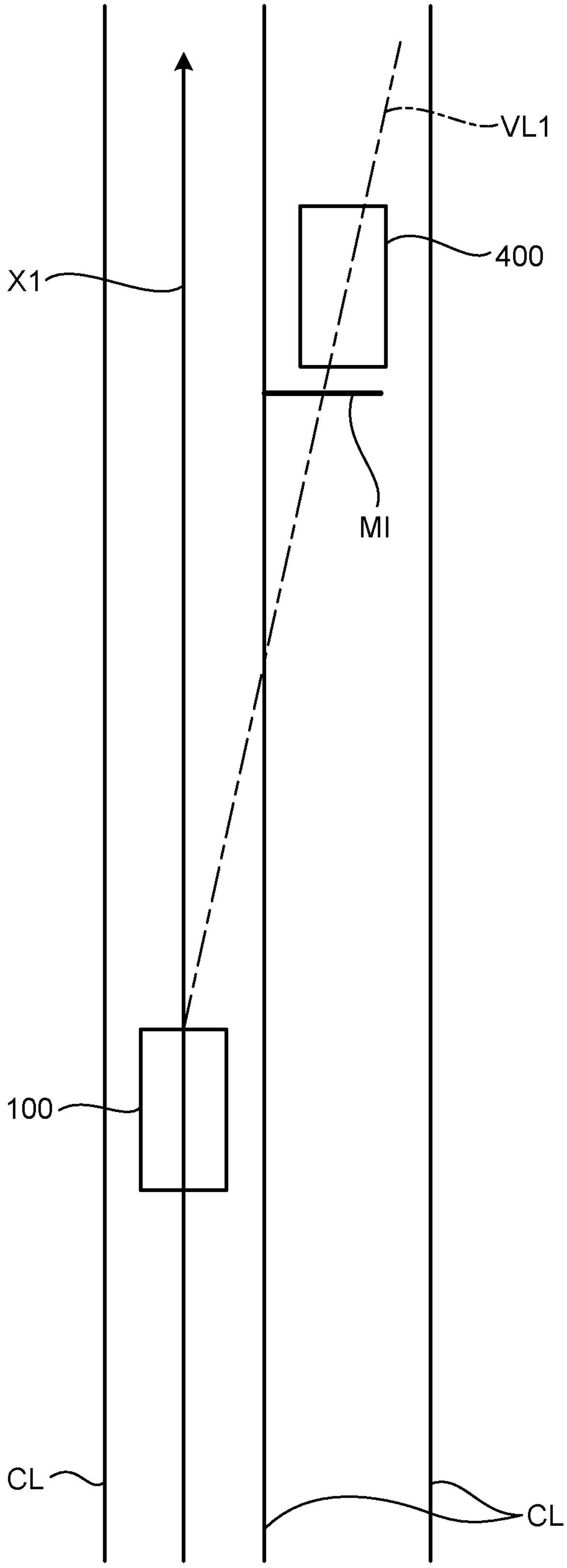
FIG. 8 is a schematic diagram illustrating a display example of a marker image by the vehicle display device according to the embodiment.
Figure 9A:
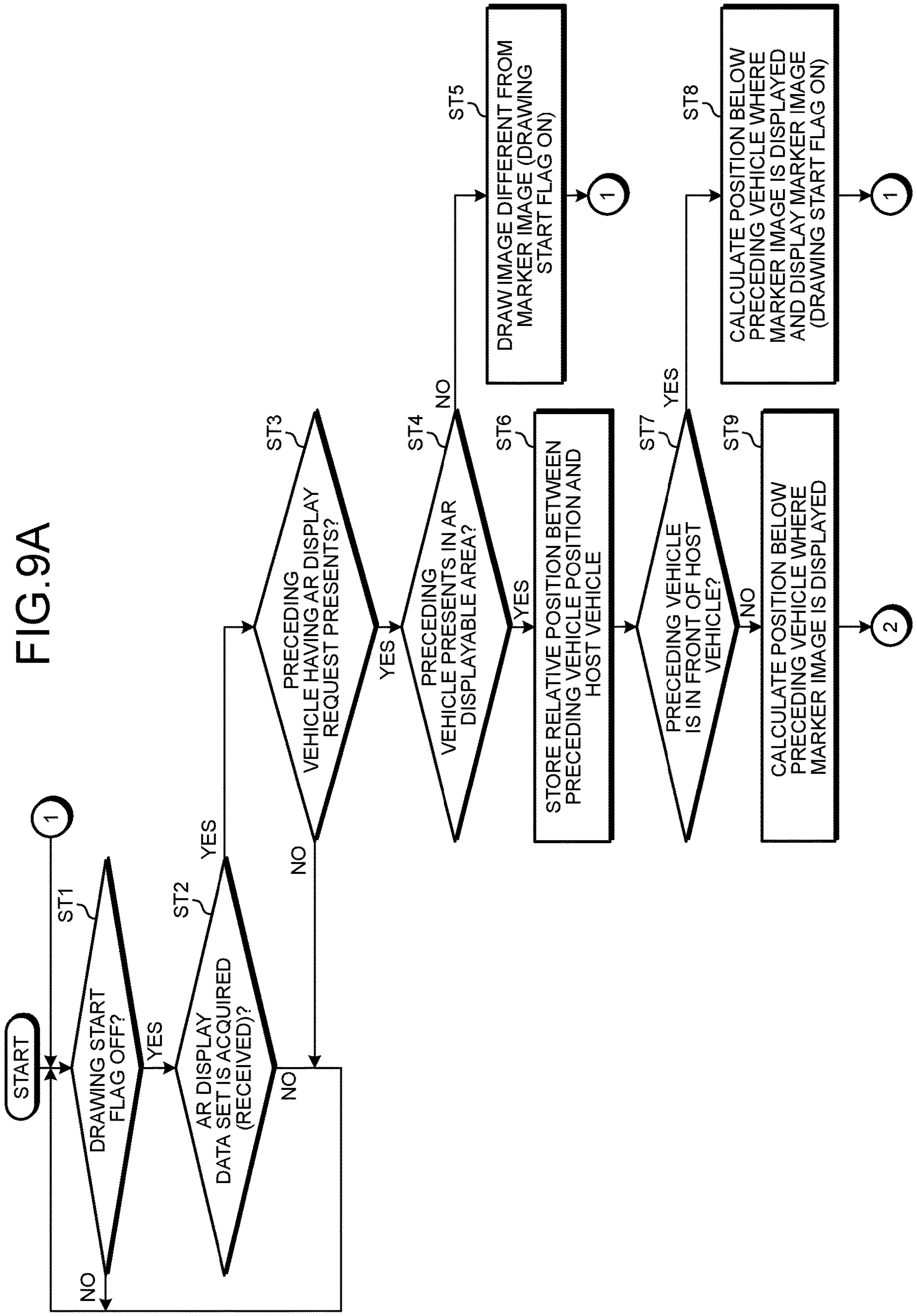
FIGS. 9A and 9B are flowcharts illustrating a method for displaying a marker image by the vehicle display device according to the embodiment.
Figure 9B:
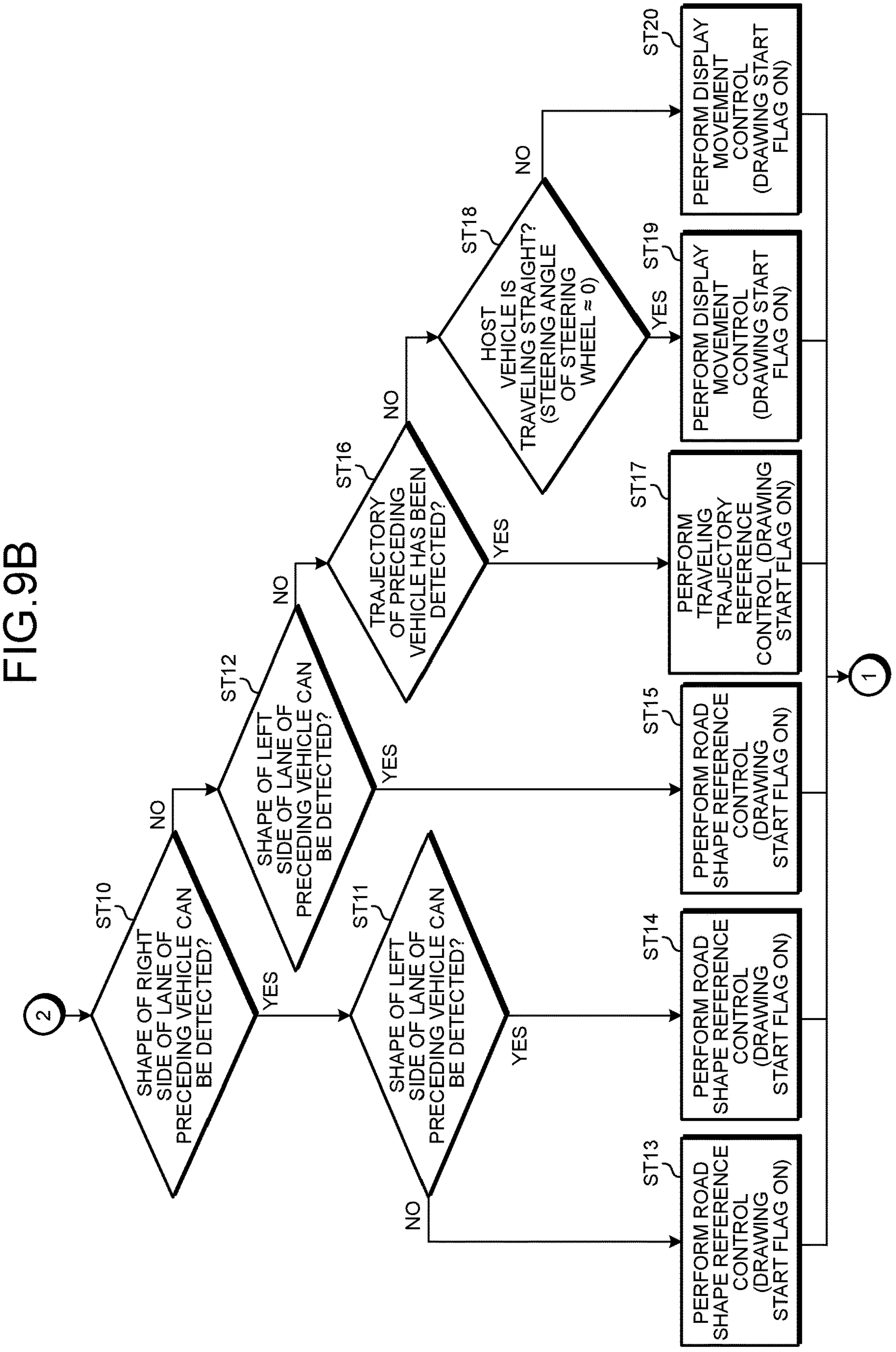

An embodiment will be described with reference to FIGS. 1 to 10. Embodiments described herein relate generally to a vehicle display device. FIG. 1 is a diagram illustrating a vehicle display device according to an embodiment, FIG. 2 is a schematic diagram illustrating a display example of a marker image by the vehicle display device according to the embodiment, FIG. 3 is a schematic diagram illustrating a display example of a marker image by the vehicle display device according to the embodiment, FIG. 4 is a schematic diagram illustrating a display example of a marker image by the vehicle display device according to the embodiment, FIG. 5 is a schematic diagram illustrating a display example of a marker image by the vehicle display device according to the embodiment, FIG. 6 is a schematic diagram illustrating a display example of a marker image by the vehicle display device according to the embodiment, FIG. 7 is a schematic diagram illustrating a display example of a marker image by the vehicle display device according to the embodiment, FIG. 8 is a schematic diagram illustrating a display example of a marker image by the vehicle display device according to the embodiment, and FIGS. 9A and 9B are flowcharts illustrating a method for displaying a marker image by a vehicle display device according to the embodiment.

A vehicle display device 1 according to the embodiment is an augmented reality head-up display device (AR-HUD) mounted on a vehicle 100 such as an automobile. The vehicle display device 1 projects display light of an image toward a windshield. The windshield is a reflector located in front of a driver's seat in the vehicle 100. The windshield has, for example, translucency and reflects display light incident from the vehicle display device 1 toward the eye point EP of the vehicle 100. The driver of the vehicle 100 recognizes the image reflected by the windshield as a virtual image. For the driver, the virtual image is recognized as if the virtual image exists in front of the windshield.

In the present specification, unless otherwise specified, the "front-rear direction" indicates a vehicle front-rear direction of the vehicle 100 on which the vehicle display device 1 is mounted. Unless otherwise specified, the "vehicle width direction" indicates a vehicle width direction of the vehicle 100, and the "vertical direction" indicates a vehicle vertical direction of the vehicle 100.

As illustrated in FIG. 1, the vehicle display device 1 according to the embodiment includes a display 11, a controller 12, an external information acquisition unit 13, and a host vehicle information acquisition unit 14.

The display 11 performs augmented reality (AR) display by superimposing and displaying a virtual image on a landscape of a front viewing field of the vehicle 100 based on information from the controller 12 described later.

The display 11 includes a liquid crystal display, a backlight, and a mirror (not illustrated). The liquid crystal display unit is a liquid crystal display device such as a thin film transistor-liquid crystal display (TFT-LCD), and displays an arbitrary image, for example, a color image. The backlight emits light from the back side of the liquid crystal display unit to project the image displayed on the liquid crystal display unit toward the mirror. The mirror reflects the image projected from the liquid crystal display unit toward the windshield. The image projected from the mirror is reflected by the windshield toward the viewpoint position EP of the vehicle. The image reflected by the windshield is formed as a virtual image at a position in front of the vehicle 100 with respect to the windshield when viewed from the driver.

Here, the viewpoint position EP is typically assumed in advance to be located within a so-called eye range in the vehicle 100 to which the vehicle display device 1 is applied. Here, the eye range is a "driver's eye range of an automobile", and corresponds to an area where a driver's viewpoint determined in advance according to the vehicle is located. The eye range is typically a statistical representation of the distribution of the positions of the driver's eyes in the vehicle 100, and corresponds to, for example, an area including the positions of the driver's eyes of a predetermined ratio (for example, 95%) in a state where the driver is seated in the driver's seat. Here, the viewpoint position EP is assumed based on the driver of the vehicle 100.

The controller 12 controls the display 11 to display the marker image MI that emphasizes the presence of a display target such as a preceding vehicle 200 (see FIGS. 2 to 7), another vehicle 300 different from the preceding vehicle 200 (see FIG. 7), and an oncoming vehicle 400 (see FIG. 8). Here, the other vehicle 300 is a vehicle that travels in the same direction in a lane different from the traveling lane in which the vehicle 100 and the preceding vehicle 200 travel. The oncoming vehicle 400 is a vehicle traveling in an oncoming lane.

In the embodiment, the external information acquisition unit 13 includes a position information acquisition unit 13*a*, a traveling trajectory acquisition unit 13*b*, and a road shape detection unit 13*c*. The external information acquisition unit 13 of the embodiment includes an electronic control unit (ECU) of an advanced driving assistance system (ADAS), an electronic control unit (ECU) of a navigation device, and a peripheral device (auxiliary device) mounted on the vehicle 100 and capable of acquiring information outside the vehicle 100.

In the embodiment, a front camera 31 and an in-vehicle sensor 32 are mounted on the vehicle 100. The position information acquisition unit 13*a*, the traveling trajectory acquisition unit 13*b*, and the road shape detection unit 13*c* are configured to be able to communicate with the front camera 31 and the in-vehicle sensor 32. Further, the traveling trajectory acquisition unit 13*b* and the road shape detection unit 13*c* are configured to acquire navigation information 33.

The front camera 31 is mounted at a position where a landscape in front of the vehicle 100 can be captured. For example, it is disposed on a roof, a rearview mirror, or the like in the interior of the vehicle 100. The front camera 31 continuously captures a landscape in front of the vehicle 100, and acquires an image or a moving image in front of the vehicle 100. The front camera 31 sequentially outputs the captured image or moving image to the position information acquisition unit 13*a*.

The in-vehicle sensor 32 detects the preceding vehicle 200 and the other vehicle 300. As the in-vehicle sensor 32, for example, a LiDAR (Laser Imaging Detection and Ranging) or a radar sensor is used. The in-vehicle sensor 32 can detect, for example, a relative position and a relative speed of the preceding vehicle 200 with respect to the vehicle 100. The in-vehicle sensor 32 can also detect the size and shape of the preceding vehicle 200. Further, the in-vehicle sensor 32 can also detect, for example, relative positions and relative speeds of the other vehicle 300 and the oncoming vehicle 400 with respect to the vehicle 100. In addition, the in-vehicle sensor 32 can also detect, for example, the size and shape of the other vehicle 300 and the oncoming vehicle 400.

The navigation information 33 includes, for example, information on a road shape on which the vehicle 100 travels and information on a traveling status of the preceding vehicle 200, the other vehicle 300, and the oncoming vehicle 400. For example, the navigation information 33 includes three-dimensional map information and two-dimensional map information. Furthermore, the navigation information 33 may include information regarding the position and shape of the colored line (center line, road side, and lane boundary) CL on the road.

The host vehicle information acquisition unit 14 acquires information on the vehicle 100. Meters 41 such as a steering angle sensor of a steering wheel, a speedometer, an angular accelerometer, and an accelerometer are mounted on the vehicle 100. The host vehicle information acquisition unit 14 is configured to be able to communicate with these meters 41, and acquires information regarding the steering angle, speed, angular acceleration, and acceleration of the steering wheel of the vehicle 100. In the embodiment, the host vehicle information acquisition unit 14 receives information on the steering angle of the steering wheel of the vehicle 100 detected by the steering angle sensor of the steering wheel.

The controller 12 includes nonvolatile memories such as a power switch 12*a*, a system-on-a-chip (SoC) 12*b*, a ROM 12*c*, and a RAM 12*d*, a communication I/F 12*e*, and an external I/F 12*f*.

The power switch 12*a* is connected to the power source Bn of the vehicle 100, and turns on and off the power source of the vehicle display device 1.

The SoC 12*b* includes a central processing unit (CPU), a graphics processing unit (GPU), a chip set, and the like. The SoC 12*b* is connected to the display 11, the meters 21 of the vehicle 100, the ROM 12*c*, the RAM 12*d*, the communication I/F 12*e*, and the external I/F 12*f*. The SoC 12*b* performs various calculation processing such as calculation for performing AR display.

The ROM 12*c* is an internal storage of the controller 12, and stores data necessary for the controller 12 to control the display 11, and the ROM 12*c* stores data newly acquired by the controller 12. For example, an AR display data set or the like for performing AR display may be recorded in the ROM 12*c*. The RAM 12*d* is a memory of the controller 12, and data extracted from the ROM 12*c*, data acquired from the external information acquisition unit 13 and the host vehicle information acquisition unit 14, and the like are temporarily stored in the RAM 12*d* and used for arithmetic processing in the SoC 12*b*.

The communication I/F 12*e* connects the SoC 12*b* and the external information acquisition unit 13. The SoC 12*b* acquires information outside the vehicle 100 from the external information acquisition unit 13 via the communication I/F 12*e*.

The external I/F 12*f* connects the SoC 12*b* and the host vehicle information acquisition unit 14. The SoC 12*b* acquires information regarding the vehicle 100 from the host vehicle information acquisition unit 14 via the external I/F 12*f*.

In the embodiment, the controller 12 controls the display 11 to display the marker image MI as the AR display image. The marker image MI displayed as the AR display image is displayed so as to follow the movement of the preceding vehicle 200 or the like as a display target, for example. As illustrated in FIGS. 2 and 3, the marker image MI of the embodiment is a rod-like display extending along the vehicle width direction.

The marker image MI is displayed at a position below the preceding vehicle 200. The marker image MI displayed at a position below the preceding vehicle 200 is visually recognized at a position shifted from the actual display position MO due to an illusion when viewed from the viewpoint position EP by the driver of the vehicle 100. Specifically, the marker image MI is visually recognized while being shifted to the rear side of the preceding vehicle 200 from the actual display position MO. As a result, the marker image MI is visually recognized as following the rear of the preceding vehicle 200.

When the distance between the vehicle 100 and the preceding vehicle 200 in the front-rear direction is L1, the amount of deviation of the marker image MI from the actual display position MO due to the illusion is L2, the height from the ground to the viewpoint position EP of the vehicle 100 is h, the vehicle height from the ground of the preceding vehicle 200 is D, and the interval between the preceding vehicle 200 and the actual display position MO of the marker image in the vertical direction is d, the amount of deviation L2 of the marker image MI from the actual display position MO due to the illusion is expressed by the following equation (1).

$$L2 = d \times L1 \div (h + d) \tag{1}$$

Note that the deviation amount L2 of the marker image MI may be obtained by multiplying the relative speed between the vehicle 100 and the preceding vehicle 200 by a coefficient determined in advance according to the delay time (seconds) of the vehicle 100. Here, the delay time (seconds) of the vehicle 100 is an elapsed time until the vehicle 100 reaches a position through which the preceding vehicle 200 has passed.

Further, the deviation amount L2 of the marker image MI may be a constant determined in advance according to the size and shape of the preceding vehicle 200. This constant is set in consideration of the size, shape, and the like of the preceding vehicle 200 such that the marker image MI is appropriately viewed with respect to the preceding vehicle 200.

In the embodiment, the SoC 12*b* acquires the position information of the preceding vehicle 200 detected by the position information acquisition unit 13*a* via the communication I/F. The position information acquisition unit 13*a* of the embodiment corresponds to an electronic control unit (ECU) of an advanced driving assistance system (ADAS). Note that, in a case where the position information of the preceding vehicle 200 can be acquired by the navigation device, the position information acquisition unit 13*a* may correspond to an electronic control unit (ECU) of the navigation device. In addition, in a case where the position information of the preceding vehicle 200 can be acquired by some auxiliary device, the position information acquisition unit 13*a* may correspond to the auxiliary device.

The position information acquisition unit 13*a* of the embodiment acquires the position of the preceding vehicle 200 traveling in front of the vehicle 100 by the front camera 31 and the in-vehicle sensor 32. In addition, when another vehicle 300 different from the preceding vehicle 200 or the oncoming vehicle 400 is present in front of the vehicle 100, the position information acquisition unit 13*a* can also acquire these positions. The controller 12 calculates, by the SoC 12*b*, a first virtual straight line VL1 (see FIGS. 4 to 7) connecting the position of the preceding vehicle 200 acquired by the position information acquisition unit 13*a* and the position of the vehicle 100.

The controller 12 compares the straight direction X1 of the vehicle 100 with the first virtual straight line VL1 by the SoC 12*b*, and determines whether the first virtual straight line VL1 is along the straight direction X1 of the vehicle 100. As illustrated in FIG. 4, when the vehicle 100 and the preceding vehicle 200 followed by the vehicle 100 are traveling in a straight lane, the first virtual straight line VL1 is along the straight direction X1 of the vehicle 100. When the controller 12 determines that the first virtual straight line VL1 is along the straight direction X1 of the vehicle 100, the controller 12 controls the display 11 to display the marker image MI at a position below the preceding vehicle 200 as viewed from the viewpoint position EP of the vehicle 100 as illustrated in FIGS. 2 and 4. At this time, the marker image MI is displayed below the preceding vehicle 200 such that the center of the preceding vehicle 200 in the vehicle width direction and the center of the marker image MI in the vehicle width direction overlap each other.

On the other hand, as illustrated in FIG. 5, when the preceding vehicle 200 is traveling in a curved part of the lane and the vehicle 100 is traveling in a straight part of the lane, the first virtual straight line VL1 is inclined with respect to the straight direction X1 of the vehicle 100. When the controller 12 determines that the first virtual straight line VL1 is inclined with respect to the straight direction X1, the controller 12 performs display movement control to display the marker image MI so as to be shifted from the position below the preceding vehicle 200 in the direction opposite to the inclination direction of the first virtual straight line VL1 with respect to the straight direction X1. Here, the amount by which the marker image MI is shifted from the position below the preceding vehicle 200 is represented by an angle AS formed by a second virtual straight line VL2 connecting the center of the front of the vehicle 100 and the center of the marker image MI in the vehicle width direction and the first virtual straight line VL1. An angle A2 formed by the straight direction X1 and the second virtual straight line VL2 is expressed by A2=A1−AS.

In the display movement control, by displaying the marker image MI so as to be shifted by a predetermined amount from the position below the preceding vehicle 200, the marker image MI is prevented from being displayed overlapping the colored line CL and the other vehicle 300 traveling on another lane when viewed from the viewpoint position EP of the vehicle 100.

In the embodiment, as illustrated in FIGS. 6 and 7, when both the vehicle 100 and the preceding vehicle 200 are traveling in a curved part of the traveling lane, the amount by which the marker image MI is shifted may be corrected by the steering angle of the steering wheel. In this case, in the display movement control, the amount AS by which the marker image MI is shifted from the position below the preceding vehicle 200 is determined based on the inclination of the first virtual straight line VL1 with respect to the straight direction X1 and the steering angle of the steering wheel of the vehicle 100.

In the display movement control, the shift amount AS is expressed by the following equation (2), where A1 is the angle formed by the straight direction X1 and the first virtual straight line VL1, and θ is the steering angle of the steering wheel. The steering angle of the steering wheel is positive in a direction that coincides with the inclination direction of the first virtual straight line VL1 with respect to the straight direction X1.

$$AS = A1 \div 2 + \theta \quad (2)$$

The controller 12 performs display movement control by displaying the marker image MI such that the second virtual straight line VL2 is shifted from the first virtual straight line VL1 by the shift amount AS in the direction opposite to the inclination direction of the first virtual straight line VL1 with respect to the straight direction X1.

When the steering angle θ of the steering wheel is equal to or smaller than a predetermined threshold, the marker image MI may be displayed without being shifted. The predetermined threshold is, for example, a steering angle of the steering wheel at which the steering angle of the steering wheel is sufficiently small and at which it is considered that there is no problem even if the marker image MI is displayed as in the case where the vehicle 100 travels straight.

In addition, the amount AS by which the marker image MI is shifted from the position below the preceding vehicle 200 in the display movement control may be determined based only on the inclination of the first virtual straight line VL1 with respect to the straight direction X1 regardless of the shape of the traveling lane of the vehicle 100. In this case, the amount AR by which the marker image MI is shifted is, for example, a half of the angle A1 formed by the straight direction X1 and the first virtual straight line VL1.

The amount AS by which the marker image MI is shifted from the position below the preceding vehicle 200 in the display movement control may be determined based on the inclination of the first virtual straight line VL1 with respect to the straight direction X1 and the distance between the vehicle 100 and the preceding vehicle 200. In this case, the shift amount AS of the marker image MI is expressed by the following equation (3), where L1 is a distance between the vehicle 100 and the preceding vehicle 200, L2 is a shift amount of the marker image MI from the actual display position MO due to an illusion, and A1 is an angle formed by the first virtual straight line VL1 with respect to the straight direction X1.

$$AS = (A1 \times L2) \div L1 \quad (3)$$

Furthermore, the amount AS by which the marker image MI is shifted from the position below the preceding vehicle 200 in the display movement control may be corrected in accordance with the speed of the vehicle 100. In this case, the amount AS by which the marker image MI is shifted from the position below the preceding vehicle 200 in the display movement control is determined based on the inclination of the first virtual straight line VL1 with respect to the straight direction X1 and the speed of the vehicle 100.

For example, the amount AS by which the marker image MI is shifted is, for example, AS=A1÷2 when the speed of the vehicle 100 is 100 km/h or more, and AS=A1÷(3×2) when the speed of the vehicle 100 is less than 100 km/h.

As illustrated in FIG. 8, the controller 12 may display the marker image MI for the oncoming vehicle 400 traveling in the opposite lane. When the speed difference between the vehicle 100 and the vehicle in front of the vehicle 100 is larger than the speed of the vehicle 100, the controller 12 determines that the vehicle is the oncoming vehicle 400 and displays the marker image MI without shifting the marker image MI from the position below the oncoming vehicle 400.

The traveling trajectory acquisition unit 13*b* acquires the traveling trajectory T1 of the preceding vehicle 200. In the embodiment, the traveling trajectory acquisition unit 13*b* corresponds to an electronic control unit (ECU) of an advanced driving assistance system (ADAS). The traveling trajectory acquisition unit 13*b* may correspond to an electronic control unit (ECU) of the navigation device. In addition, in a case where the traveling trajectory of the preceding vehicle 200 can be acquired by some auxiliary device, the traveling trajectory acquisition unit 13*b* may correspond to the auxiliary device.

For example, the traveling trajectory acquisition unit 13*b* acquires the traveling trajectory T1 of the preceding vehicle 200 from the image or the moving image acquired from the front camera 31. Note that the traveling trajectory acquisition unit 13*b* may acquire the traveling trajectory T1 of the preceding vehicle 200 based on the information from the in-vehicle sensor 32. When the traveling trajectory acquisition unit 13*b* corresponds to the electronic control unit (ECU) of the navigation device, the traveling trajectory of the preceding vehicle 200 may be acquired from the navigation information 33.

When the controller 12 can acquire the traveling trajectory T1 of the preceding vehicle 200 by the traveling trajectory acquisition unit 13*b*, the controller 12 performs, instead of the display movement control, the traveling trajectory reference control of displaying the center of the marker image MI so as to overlap the center of the traveling trajectory T1 (see FIGS. 6 and 7). As a result of the traveling trajectory reference control, it is possible to suppress the marker image MI from being displayed so as to overlap the other vehicle 300 (or the oncoming vehicle 400) and the colored line CL.

For example, when the controller 12 determines that the first virtual straight line VL1 is inclined with respect to the straight direction X1 and when the controller 12 can acquire the traveling trajectory T1 of the preceding vehicle 200 by the traveling trajectory acquisition unit 13*b*, the controller 12 performs the traveling trajectory reference control of displaying the center of the marker image MI in the vehicle width direction so as to overlap the center of the traveling trajectory T1 instead of the display movement control.

Then, when the controller 12 determines that the first virtual straight line VL1 is inclined with respect to the straight direction X1, and when the controller 12 cannot acquire the traveling trajectory T1 of the preceding vehicle 200 by the traveling trajectory acquisition unit 13*b*, the controller 12 performs the display movement control.

The road shape detection unit 13*c* detects a road shape on which vehicles such as the vehicle 100 and the preceding vehicle 200 travel. The road shape detection unit 13*c* of the embodiment corresponds to an electronic control unit (ECU) of a navigation device. The traveling trajectory acquisition unit 13*b* may correspond to an electronic control unit (ECU) of an advanced driving assistance system (ADAS). In addition, in a case where the road shape can be acquired by some auxiliary device, the road shape detection unit 13*c* may correspond to the auxiliary device.

For example, the road shape detection unit 13*c* detects the road shape from the navigation information 33. When the road shape detection unit 13*c* corresponds to the electronic control unit (ECU) of the advanced driving assistance system (ADAS), the road shape detection unit 13*c* detects the road shape from the image or the moving image acquired from the front camera 31.

In the vehicle display device 1 according to the embodiment, when the controller 12 determines that the first virtual straight line VL1 is inclined with respect to the straight direction X1 and when the controller 12 can acquire the shape of the traveling lane of the preceding vehicle 200 by the road shape detection unit 13*c*, the controller 12 performs road shape reference control of displaying the marker image MI at the center of the traveling lane based on the detected shape of the traveling lane, instead of the display movement control and the traveling trajectory reference control.

Then, when the controller 12 determines that the first virtual straight line VL1 is inclined with respect to the straight direction X1 and the controller 12 cannot acquire the shape of the traveling lane of the preceding vehicle 200 by the road shape detection unit 13*c*, the controller 12 performs the display movement control or the traveling trajectory reference control.

The road shape detection unit 13*c* may detect at least one of the pair of colored lines CL sandwiching the traveling lane of the preceding vehicle 200 as the road shape. When the road shape detection unit 13*c* corresponds to an electronic control unit (ECU) of the navigation device, at least one of the pair of colored lines CL is detected from the navigation information 33. When the road shape detection unit 13*c* corresponds to an electronic control unit (ECU) of an advanced driving assistance system (ADAS), the road shape detection unit 13*c* detects at least one of the pair of colored lines CL from an image or a moving image acquired from the front camera 31.

In the road shape reference control, the controller 12 displays the marker image MI at the center of the traveling lane based on the position of the colored line CL detected by the road shape detection unit 13*c*. When only one colored line CL of the pair of colored lines CL sandwiching the traveling lane of the preceding vehicle 200 can be detected, the controller 12 may display the marker image MI so as to be shifted from the detected colored line CL by a predetermined amount. For example, the controller 12 may display the marker image MI near the center of the lane by displaying the marker image MI at a distance of 0.75 m from the detected colored line CL in the inward direction of the traveling lane.

Next, an example of a display control method of the marker image MI of the vehicle display device 1 according to the embodiment will be described with reference to FIGS. 9A and 9B.

In FIGS. 9A and 9B, in step ST1, the controller 12 determines whether the drawing start flag of the display image is OFF. As a result of this determination, in a case where the drawing start flag is ON, the drawing of the display image is continued, and the processing returns to step ST1. When the drawing start flag is OFF, the processing proceeds to step ST2.

In step ST2, the controller 12 determines whether the AR display data set has been acquired (received). As a result of this determination, in a case where the AR display data set has not been acquired (not received), the processing returns to step ST1, and in a case where the AR display data set has been acquired (received), the processing proceeds to step ST3.

In step ST3, the controller 12 determines whether there is a preceding vehicle 200 having an AR display request such as the preceding vehicle 200. As a result of this determination, in a case where there is no preceding vehicle 200 having the AR display request, the processing returns to step ST1, and in a case where there is a preceding vehicle 200 having the AR display request, the processing proceeds to step ST4.

In step ST4, the controller 12 determines whether the preceding vehicle 200 is in the AR displayable area. As a result of this determination, if the preceding vehicle 200 is not in the AR displayable area, the processing proceeds to step ST5, whereas if the preceding vehicle 200 is in the AR displayable area, the processing proceeds to step ST6. Here, the AR displayable area is a display area in which the AR display image such as the marker image MI can be displayed by the vehicle display device 1 in the vehicle 100.

In step ST5, the controller 12 turns on the drawing start flag, draws a display image different from the marker image MI, and causes the display 11 to display the display image. In step ST5, the controller 12 displays, for example, ambient display that is not AR display or a normal marker image that is not AR display as the display image. Thereafter, the processing returns to step ST1.

In step ST6, the controller 12 stores the relative position between the preceding vehicle 200 and the vehicle 100 (host vehicle) based on the information acquired from the external information acquisition unit 13. Thereafter, the processing proceeds to step ST7.

In step ST7, the controller 12 determines whether the position of the preceding vehicle 200 is in front of the vehicle 100. In the embodiment, by comparing the straight direction X1 of the vehicle 100 with the first virtual straight line VL1 and determining whether the first virtual straight line VL1 is along the straight direction X1 of the vehicle 100, it is determined whether the position of the preceding vehicle 200 is in front of the vehicle 100. As a result of the determination in step ST7, if the position of the preceding vehicle 200 is in front of the vehicle 100 (if the first virtual straight line VL1 is along the straight direction X1 of the vehicle 100), the processing proceeds to step ST8, whereas if the position of the preceding vehicle 200 is not in front of the vehicle 100 (if the first virtual straight line VL1 is inclined with respect to the straight direction X1 of the vehicle 100), the processing proceeds to step S9.

In step ST8, the controller 12 calculates the position where the marker image MI is displayed based on the distance between the preceding vehicle 200 and the vehicle 100, the size, the shape, and the like of the preceding vehicle 200, turns on the drawing start flag, and starts the display of the marker image MI. Thereafter, the processing returns to step ST1.

In step ST9, the controller 12 calculates the position where the marker image MI is displayed based on the distance between the preceding vehicle 200 and the vehicle 100, the size, the shape, and the like of the preceding vehicle 200. Thereafter, the processing proceeds to step ST10.

In step ST10, the controller 12 determines whether the shape of the right side of the traveling lane of the preceding vehicle 200 has been detected by the road shape detection unit 13*c*. For example, the controller 12 determines whether the colored line CL existing on the right side of the preceding vehicle 200 can be detected as the shape of the right side of the traveling lane of the preceding vehicle 200. As a result of this determination, if the shape of the right side of the traveling lane of the preceding vehicle 200 has been detected, the processing proceeds to step ST11, whereas if the shape of the right side of the traveling lane of the preceding vehicle 200 has not been detected, the processing proceeds to step ST12.

In step ST11, the controller 12 determines whether the shape of the left side of the traveling lane of the preceding vehicle 200 has been detected by the road shape detection unit 13*c*. For example, the controller 12 determines whether the colored line CL existing on the left side of the preceding vehicle 200 can be detected as the shape of the left side of the traveling lane of the preceding vehicle 200. As a result of this determination, if the shape of the left side of the traveling lane of the preceding vehicle 200 has not been detected, the processing proceeds to step ST13, whereas if the shape of the left side of the traveling lane of the preceding vehicle 200 has been detected, the processing proceeds to step ST14.

In step ST13, the display position of the marker image MI is calculated only based on the shape of the right side of the traveling lane of the preceding vehicle 200, the drawing start flag is turned on, and road shape reference control is performed. Thereafter, the processing returns to step ST1.

In step ST14, the display position of the marker image MI is calculated based on the left and right shapes of the traveling lane of the preceding vehicle 200, the drawing start flag is turned on, and road shape reference control is performed. Thereafter, the processing returns to step ST1.

In step ST12, as in step ST11, the controller 12 determines whether the shape of the left side of the traveling lane of the preceding vehicle 200 has been detected by the road shape detection unit 13*c*. As a result of this determination, if the shape of the left side of the traveling lane of the preceding vehicle 200 has not been detected, the processing proceeds to step ST15, whereas if the shape of the left side of the traveling lane of the preceding vehicle 200 has been detected, the processing proceeds to step ST16.

In step ST15, the display position of the marker image MI is calculated only based on the shape on the left side of the traveling lane, the drawing start flag is turned on, and road shape reference control is performed. Thereafter, the processing returns to step ST1.

In step ST16, the controller 12 determines whether the traveling trajectory T1 of the preceding vehicle 200 has been acquired by the traveling trajectory acquisition unit 13*b*. As a result of this determination, if the traveling trajectory T1 of the preceding vehicle 200 has been acquired, the processing proceeds to step ST17, whereas if the traveling trajectory T1 of the preceding vehicle 200 has not been acquired, the processing proceeds to step ST18.

In step ST17, the controller 12 calculates the position of the marker image MI based on the traveling trajectory T1 of the preceding vehicle 200, turns on the drawing start flag, and performs the traveling trajectory reference control. Thereafter, the processing returns to step ST1.

In step ST18, the controller 12 determines whether the vehicle 100 is traveling straight from the steering angle of the steering wheel of the vehicle 100 acquired by the host vehicle information acquisition unit 14. In the embodiment, the controller 12 determines that the vehicle 100 is traveling straight when the steering angle of the steering wheel of the vehicle 100 is 0 degrees or an angle equal to or less than a predetermined threshold. As a result of this determination, if the vehicle 100 is traveling straight, the processing proceeds to step ST19, whereas if the vehicle 100 is not traveling straight from the steering angle of the steering wheel of the vehicle 100, the processing proceeds to step ST20.

In step ST19, the controller 12 performs display movement control based on the inclination of the first virtual straight line VL1 with respect to the straight direction X1. In the display movement control in step ST19, the amount AR by which the marker image MI is shifted from the position below the preceding vehicle 200 is determined based on the inclination of the first virtual straight line VL1 with respect to the straight direction X1. For example, the amount AR by which the marker image MI is shifted is a half of the angle formed by the first virtual straight line VL1 and the straight direction X1. Thereafter, the processing returns to step ST1.

In step ST20, the controller 12 performs display movement control based on the steering angle of the steering wheel of the vehicle 100 and the inclination of the first virtual straight line VL1 with respect to the straight direction X1. Thereafter, the processing returns to step ST1.

In the above description, the vehicle display device 1 including the controller 12 capable of executing all of the display movement control, the traveling trajectory reference control, and the road shape reference control has been described, but the present invention is not limited thereto. For example, the controller 12 may be capable of executing only the display movement control and the traveling trajectory reference control among the display movement control, the traveling trajectory reference control, and the road shape reference control. Furthermore, the controller 12 may be capable of executing only the display movement control and the road shape reference control among the display movement control, the traveling trajectory reference control, and the road shape reference control.

As described above, the vehicle display device 1 according to the embodiment includes the display 11 that is mounted on the vehicle 100 and superimposes and displays an image on the real landscape in front of the vehicle 100 with respect to the front windshield of the vehicle 100, the controller 12 that controls the display 11, and the position information acquisition unit 13*a* that acquires the position of the preceding vehicle 200 followed by the vehicle 100. The controller 12 calculates the first virtual straight line VL1 that connects the position of the preceding vehicle 200 acquired by the position information acquisition unit 13*a* and the position of the vehicle 100. When the controller 12 determines that the first virtual straight line VL1 is along the straight direction X1 of the vehicle 100, the controller 12 displays the marker image MI at a position below the preceding vehicle 200 as viewed from the viewpoint position EP of the vehicle 100. When the controller 12 determines that the first virtual straight line VL1 is inclined with respect to the straight direction X1, the controller 12 performs display movement control to display the marker image MI so as to be shifted from the position below the preceding vehicle 200 in the direction opposite to the inclination direction of the first virtual straight line VL1 with respect to the straight direction X1. In the display movement control, the amount by which the marker image MI is shifted from the position below the preceding vehicle 200 is determined based on the inclination of the first virtual straight line VL1 with respect to the straight direction X1.

With the above configuration, the vehicle display device 1 according to the embodiment can prevent the marker image MI from overlapping the other vehicle 300, the oncoming vehicle 400, the colored line CL, and the like, and can improve the visibility of the marker image MI even when the road shape and the traveling trajectory T1 of the preceding vehicle cannot be detected.

In addition, the vehicle display device 1 according to the embodiment further includes the host vehicle information acquisition unit 14 that acquires the steering angle of the steering wheel of the vehicle 100. In the display movement control, the amount by which the marker image MI is shifted from the position below the preceding vehicle 200 is determined based on the inclination of the first virtual straight line VL1 with respect to the straight direction X1 and the steering angle of the steering wheel of the vehicle 100. In the display movement control, when the angle formed by the straight direction X1 and the first virtual straight line VL1 is A1, the steering angle of the steering wheel of the vehicle 100 is θ, and the amount by which the marker image MI is shifted from the position below the preceding vehicle 200 is the angle AS formed by the second virtual straight line VL2 connecting the center of the marker image MI and the vehicle 100 and the first virtual straight line VL1, the amount by which the marker image MI is shifted from the position below the preceding vehicle 200 is expressed by $AS=A1\div 2+\theta$.

With the above configuration, the vehicle display device 1 according to the embodiment can shift the display position of the marker image MI to a more appropriate position in consideration of not only the positional relationship between the vehicle 100 and the preceding vehicle 200 but also the steering angle of the steering wheel. Therefore, the marker image MI can be prevented from overlapping the other vehicle 300 (or the oncoming vehicle 400) and the colored line CL, and the visibility of the marker image MI can be improved.

The vehicle display device 1 according to the embodiment further includes the traveling trajectory acquisition unit 13*b* that acquires the traveling trajectory T1 of the preceding vehicle 200. When the controller 12 determines that the first virtual straight line VL1 is inclined with respect to the straight direction X1 and when the controller 12 can acquire the traveling trajectory T1 of the preceding vehicle 200 by the traveling trajectory acquisition unit 13*b*, the controller 12 performs traveling trajectory reference control of displaying the center of the marker image MI so as to overlap the center of the traveling trajectory T1 instead of the display movement control. When the controller 12 determines that the first virtual straight line VL1 is inclined with respect to the straight direction X1 and when the controller 12 cannot acquire the traveling trajectory T1 of the preceding vehicle 200 by the traveling trajectory acquisition unit 13*b*, the controller 12 performs display movement control.

With the above configuration, the vehicle display device 1 according to the embodiment displays the marker image MI based on the traveling trajectory T1 of the preceding vehicle 200, so that the marker image MI can be displayed so as to more naturally follow the preceding vehicle 200 while preventing the marker image MI from overlapping the other vehicle 300 (or the oncoming vehicle 400) or the colored line CL, and the visibility of the marker image can be improved.

The vehicle display device 1 according to the embodiment further includes the road shape detection unit 13*c* that detects a road shape. When the controller 12 determines that the first virtual straight line VL1 is inclined with respect to the straight direction X1 and when the controller 12 can acquire the shape of the traveling lane of the preceding vehicle 200 by the road shape detection unit 13*c*, the controller 12 performs road shape reference control to display the marker image MI at the center of the traveling lane based on the detected shape of the traveling lane instead of the display movement control. When the controller 12 determines that the first virtual straight line VL1 is inclined with respect to the straight direction X1 and when the controller 12 cannot acquire the shape of the traveling lane of the preceding vehicle 200 by the road shape detection unit 13*c*, the controller 12 performs display movement control.

With the above configuration, the vehicle display device 1 according to the embodiment can display the marker image MI at a more appropriate position with respect to the traveling lane by displaying the marker image MI based on the road shape, and can improve the visibility of the marker image MI.

The vehicle display device 1 according to the embodiment further includes the road shape detection unit 13*c* that detects a road shape. When the controller 12 determines that the first virtual straight line VL1 is inclined with respect to the straight direction X1 and when the controller 12 can acquire the shape of the traveling lane of the preceding vehicle 200 by the road shape detection unit 13*c*, the controller 12 performs road shape reference control to display the marker image MI at the center of the traveling lane based on the detected shape of the traveling lane instead of the display movement control and the traveling trajectory reference control. When the controller 12 determines that the first virtual straight line VL1 is inclined with respect to the straight direction X1, and when the controller 12 cannot acquire the shape of the traveling lane of the preceding vehicle 200 by the road shape detection unit 13*c*, and the traveling trajectory acquisition unit 13*b* can acquire the traveling trajectory T1 of the preceding vehicle 200, the controller 12 performs the traveling trajectory reference control. When the controller 12 determines that the first virtual straight line VL1 is inclined with respect to the straight direction X1, and when the controller 12 cannot acquire the shape of the traveling lane of the preceding vehicle 200 by the road shape detection unit 13*c* and cannot acquire the traveling trajectory T1 of the preceding vehicle 200 by the traveling trajectory acquisition unit 13*b*, the controller 12 performs the display movement control.

Similarly in the above configuration, the vehicle display device 1 according to the embodiment can display the marker image MI at a more appropriate position with respect to the traveling lane by displaying the marker image MI based on the road shape, and can improve the visibility of the marker image MI.

In the vehicle display device 1 according to the embodiment, the road shape detection unit 13*c* detects at least one of the pair of colored lines CL sandwiching the traveling lane of the preceding vehicle 200 as the road shape, and in the road shape reference control, the controller 12 displays the marker image MI at the center of the traveling lane based on the position of the colored line CL detected by the road shape detection unit 13*c*.

With the above configuration, the vehicle display device 1 according to the embodiment displays the marker image MI based on the colored line CL, so that the marker image MI can be displayed at a more appropriate position with respect to the colored line ML, and the visibility of the marker image can be improved.

Modification

Note that, in the above-described embodiment, the marker image MI has been described as a rod-like display extending along the vehicle width direction, but the present invention is not limited thereto.

Figure 10:
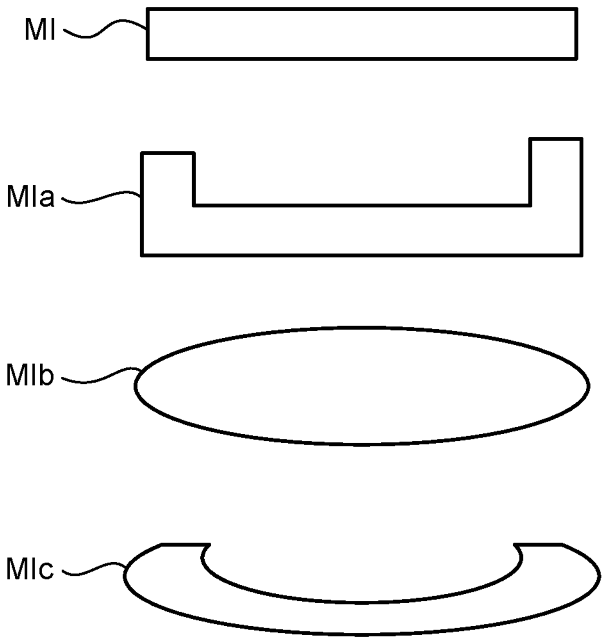
FIG. 10 is a view illustrating an example of a marker image displayed by the vehicle display device according to the embodiment.

FIG. 10 is a diagram illustrating an example of a marker image displayed by the vehicle display device according to the modification. For example, as illustrated in FIG. 10, the marker image MIa may be a concave marker image MIa with a bar-shaped display extending along the vehicle width direction and barbed at both ends, may be an elliptical marker image MIb having a longitudinal direction in the vehicle width direction, or may be an arc-shaped marker image MIc opened forward.

The contents disclosed in the above embodiments and modifications can be appropriately combined and executed.

Reference Example

Note that, as a reference example, there is a case where the controller 12 can execute only at least one of the traveling trajectory reference control and the road shape reference control among the display movement control, the traveling trajectory reference control, and the road shape reference control. That is, the controller 12 may be able to execute the traveling trajectory reference control and the road shape reference control in combination among the display movement control, the traveling trajectory reference control, and the road shape reference control, or may be able to execute only the display movement control, the traveling trajectory reference control, and the road shape reference control, respectively.

The vehicle display device 1 capable of executing only the traveling trajectory reference control among the display movement control, the traveling trajectory reference control, and the road shape reference control may continue the display without shifting the position of the marker image MI when the traveling trajectory T1 cannot be acquired by the traveling trajectory acquisition unit 13*b* and when the position of the preceding vehicle 200 is not in front of the vehicle 100.

In addition, the vehicle display device 1 capable of executing only the road shape reference control among the display movement control, the traveling trajectory reference control, and the road shape reference control may continue to display the marker image MI without shifting the position of the marker image MI when the road shape of the traveling lane cannot be acquired by the road shape detection unit 13*c* in a case where the position of the preceding vehicle 200 is not in front of the vehicle 100.

Furthermore, the vehicle display device 1 capable of executing only the road shape reference control and the road shape reference control among the display movement control, the traveling trajectory reference control, and the road shape reference control may continue to display the marker image MI without shifting the position of the marker image MI when the position of the preceding vehicle 200 is not in front of the vehicle 100, the traveling trajectory T1 cannot be acquired by the traveling trajectory acquisition unit 13*b*, and the road shape of the traveling lane cannot be acquired by the road shape detection unit 13*c*.

The vehicle display device according to the present embodiments has an effect of improving visibility of a marker image.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:

a display mounted on a vehicle, the display superimposing and displaying an image on a real landscape in front of the vehicle with respect to a front windshield of the vehicle;

a controller configured to control the display;

a position information acquisition unit that acquires a position of a preceding vehicle followed by the vehicle; and a plurality of sensors, one of the sensors acquires a steering angle of a steering wheel of the vehicle, wherein the controller calculates a first straight line connecting the position of the preceding vehicle acquired by the position information acquisition unit and a position of the vehicle, when the controller determines that the first straight line is along a straight direction of the vehicle, the controller displays a marker image at a position below the preceding vehicle as viewed from a viewpoint position of the vehicle, when the controller determines that the first straight line is inclined in an inclination direction with respect to the straight direction, the controller performs display movement control to display the marker image so as to be shifted from the position below the preceding vehicle and in a direction opposite to the inclination direction, in the display movement control, an amount by which the marker image is shifted from the position below the preceding vehicle is determined based on the inclination of the first straight line with respect to the straight direction, and in the display movement control, the amount by which the marker image is shifted from the position below the preceding vehicle is determined based on the inclination of the first straight line with respect to the straight direction and a steering angle of the steering wheel of the vehicle, and in the display movement control, when an angle formed by the straight direction and the first straight line is A1, a steering angle of the steering wheel of the vehicle is θ, and the amount by which the marker image is shifted from the position below the preceding vehicle is an angle AS formed by a second straight line connecting a center of the marker image and the vehicle and the first straight line, the amount by which the marker image is shifted from the position below the preceding vehicle is expressed by $AS=A1\div2+\theta$.

2. The vehicle display device according to claim 1, further comprising:

a traveling trajectory acquisition unit that acquires a traveling trajectory of the preceding vehicle, wherein when the controller determines that the first straight line is inclined with respect to the straight direction and when the controller can acquire the traveling trajectory of the preceding vehicle by the traveling trajectory acquisition unit, the controller performs traveling trajectory reference control of displaying a center of the marker image so as to overlap a center of the traveling trajectory instead of the display movement control, and when the controller determines that the first straight line is inclined with respect to the straight direction and when the controller cannot acquire the traveling trajectory of the preceding vehicle by the traveling trajectory acquisition unit, the controller performs the display movement control.

3. The vehicle display device according to claim 2, further comprising:

a road shape detection unit that detects a road shape, wherein when the controller determines that the first straight line is inclined with respect to the straight direction and when the controller can acquire a shape of the traveling lane of the preceding vehicle by the road shape detection unit, the controller performs road shape reference control of displaying the marker image at a center of the traveling lane based on the detected shape of the traveling lane instead of the display movement control and the traveling trajectory reference control, when the controller determines that the first straight line is inclined with respect to the straight direction, and when the controller cannot acquire the shape of the traveling lane of the preceding vehicle by the road shape detection unit and can acquire the traveling trajectory of the preceding vehicle by the traveling trajectory acquisition unit, the controller performs the traveling trajectory reference control, and when the controller determines that the first straight line is inclined with respect to the straight direction and when the controller cannot acquire the shape of the traveling lane of the preceding vehicle by the road shape detection unit and cannot acquire the traveling trajectory of the preceding vehicle by the traveling trajectory acquisition unit, the controller performs the display movement control.

4. The vehicle display device according to claim 3, wherein the road shape detection unit detects at least one of a pair of colored lines sandwiching the traveling lane of the preceding vehicle as the road shape, and in the road shape reference control, the controller displays the marker image at the center of the traveling lane based on a position of the at least one of the pair of colored lines detected by the road shape detection unit.

5. The vehicle display device according to claim 1, further comprising:

a road shape detection unit that detects a road shape, wherein when the controller determines that the first straight line is inclined with respect to the straight direction and when the controller can acquire a shape of a traveling lane of the preceding vehicle by the road shape detection unit, the controller performs, instead of the display movement control, road shape reference control of displaying the marker image at a center of the traveling lane based on the detected shape of the traveling lane, and when the controller determines that the first line is inclined with respect to the straight direction and when the controller cannot acquire the shape of the traveling lane of the preceding vehicle by the road shape detection unit, the controller performs the display movement control.

6. The vehicle display device according to claim 5, wherein the road shape detection unit detects at least one of a pair of colored lines sandwiching the traveling lane of the preceding vehicle as the road shape, and in the road shape reference control, the controller displays the marker image at the center of the traveling lane based on a position of the at least one of the pair of colored lines detected by the road shape detection unit.

* * * * *